United States Patent [19]

Komori et al.

[11] 3,972,612

[45] *Aug. 3, 1976

[54] DUPLEX COPYING APPARATUS

[75] Inventors: Shigehiro Komori, Yokohama; Yoshitomo Goshima, Kawasaki; Hajime Katayama; Koichi Miyamoto, both of Tokyo, all of Japan

[73] Assignee: Canon Kabushiki Kaisha, Tokyo, Japan

[ * ] Notice: The portion of the term of this patent subsequent to Sept. 16, 1972, has been disclaimed.

[22] Filed: Jan. 28, 1975

[21] Appl. No.: 544,829

Related U.S. Application Data

[63] Continuation of Ser. No. 405,005, Oct. 10, 1973, Pat. No. 3,905,697.

[30] Foreign Application Priority Data

Oct. 17, 1972 Japan .................... 47-103752

[52] U.S. Cl. .................... 355/26; 355/3 R; 355/75

[51] Int. Cl.² .................... G03B 27/32; G03B 27/52; G03B 27/62

[58] Field of Search .................... 355/3 R, 26, 50, 51, 355/75, 23

[56] References Cited

UNITED STATES PATENTS

| | | | |
|---|---|---|---|
| 3,506,347 | 4/1970 | Carlson | 355/3 R |
| 3,645,615 | 2/1972 | Spear, Jr. | 355/3 R |

*Primary Examiner*—Richard A. Wintercorn
*Attorney, Agent, or Firm*—Fitzpatrick, Cella, Harper & Scinto

[57] ABSTRACT

A copying apparatus capable of providing an image on both sides of a transfer material. The apparatus includes a pair of cassettes commonly usable as a feeding tray and a discharging tray, and a mechanism for detaching said cassettes. A transfer material fed from a cassette loaded in a feeding station has an image transferred thereto and fixed while passing through a required processing route, and said material is reversed onto an intermediary plate in a cassette loaded in the discharging tray station which is identical with the first mentioned cassette. The cassette which receives one side copied transfer materials when loaded in the discharging tray station is unloaded therefrom and loaded into the feeding station, and the reversed transfer material receives a second image in a manner similar to that described above.

9 Claims, 11 Drawing Figures

DUPLEX COPYING APPARATUS

This is a continuation, of application Ser. No. 405,005, filed 10/10/73, now U.S. Pat. No. 3,905,697 issued 9/16/75.

BACKGROUND OF THE INVENTION

1. Field of the Invention

This invention relates to a duplex (two sides) copying apparatus which can selectively perform either one side copying or two sides copying, as compared to a conventional type which employs only one side copying onto a transfer material.

2. Description of the Prior Art

Prior art copying apparatus are generally those which provide an image only on one side of a transfer material. According to such a previous method, however, in case of storing a great amount of copied materials, the copied material will be doubled, as compared with copied material made by the duplex copying, which is disadvantageous in respect of storing space, weight, cost, and the like.

There have been considered several types of duplex copying apparatuses in the form of transfer systems. First, there is a type in which separate images are formed on two photosensitive drums for the subsequent transfer thereof to the respective surfaces of a transfer material. However, this type is simple in its principle but requires two sets of copying processes, and therefore the apparatus will be expensive and larger in size. Second, there is a type in which an image of one surface is first formed on the photosensitive drum and then transferred to a medium drum to hold it thereon for the time being, and an image of the other surface is successively formed on the same photosensitive drum. Thereafter the images are transferred to the transfer material from the medium drum and the photosensitive drum. In this type, there is required only one set of copying process elements, but two transfers should be made through the aid of the medium drum, which deteriorates the transfer efficiency. Third, there is a type in which one side of a transfer material is first treated with a conventional one side copying, the transfer material, one side of which has been copied, is again introduced into an original feeding device or a second feeding device, and the material is turned upside down and fed into the copying apparatus for effecting a conventional one side copying on the back. In this third type, there is required only one set of copying process elements, as in the one side copying device, which provides an inexpensive and compact apparatus and serves as a most practical duplex copying apparatus, However, the third type just mentioned also has problems concerning (1) a method for reversing a transfer material, one side of which has been copied, when it is fed into the copying apparatus again; (2) a method for properly arranging a transfer material, one side of which has been copied, when it is put on the feeding device; (3) a method for securely separating one by one and delivering the material from the feeding device when it is fed into the copying apparatus for the second time; (4) a method for copying with a large amount of duplex copying; and (5) a duplex copying method which can select either one side copying or duplex copying in case of necessity.

BRIEF SUMMARY OF THE INVENTION

It is therefore an object of this invention to provide a practical duplex copying apparatus.

It is a further object of this invention to provide an inexpensive and compact duplex copying apparatus.

It is another object of this invention to provide a duplex copying apparatus which can reverse a copying material in a simple manner.

It is still another object of this invention to provide a duplex copying apparatus in which a copying material, one side of which has been copied, is properly arranged to feed it for copying the other surface.

It is a further object of this invention to provide a duplex copying apparatus which can securely separate and feed a copying material.

It is yet another object of this invention to provide a duplex copying apparatus which can cope with a large amount of duplex copying.

It is a further object of this invention to provide a duplex copying apparatus which can select either one side copying or duplex copying as desired.

A copying apparatus embodying the present invention comprises a pair of cassettes commonly usable as a feeding tray and a discharging tray, and a mechanism for detaching said cassette, wherein a transfer material P fed from a cassette loaded in a feeding station is transferred and fixed through a required route, and said material P is reversed onto an intermediary plate in a cassette, identical to the first mentioned cassette, loaded in the discharging tray station. The duplex copying may be performed such that the cassette, which encases one side copied transfer materials and which is loaded in the discharging tray station, is unloaded from the discharging tray station and loaded into the feeding station, and the reversed transfer material is copied again in a manner similar to the above-described manner.

With the apparatus of the invention constructed as above, the foregoing various problems can be solved. That is, (1) the arrangement of a route for transporting a transfer material within the copying machine as shown in the drawings requires no transfer material reversing means. (2) The mere provision of a simple guide or a side plate can properly arrange a transfer material once discharged outside the machine, and further manual operation prior to insertion of a transfer material into the feeding device makes for correct handling. (3) The most convenient and reliable separating pawl is incorporated to separate and feed transfer materials one by one at the time of feeding them, and further the transfer material may be inserted below the separating pawl in an extremely simple operation. (4) Even in case of duplex copying a great amount of materials, transfer materials are merely increasingly put on the cassette and operation involves no difficulties. (5) The transfer material, one side of which has been copied, is once discharged outside the machine and at this time either one side copying or duplex copying may be suitably selected, thus eliminating difficulties of taking the material out of a continuous duplex copying process.

In addition, no requirement for special mechanical devices for the duplex copying operation, so that there is provided to obtain a compact, inexpensive, and extremely reliable copying machine. Even in the event that a transfer material, one side of which has been copied, is once stored in the cassette and the back of which is to be copied later, other copying operations will not be adversely affected during such time.

DESCRIPTION OF THE PREFERRED EMBODIMENT

Figure 1:
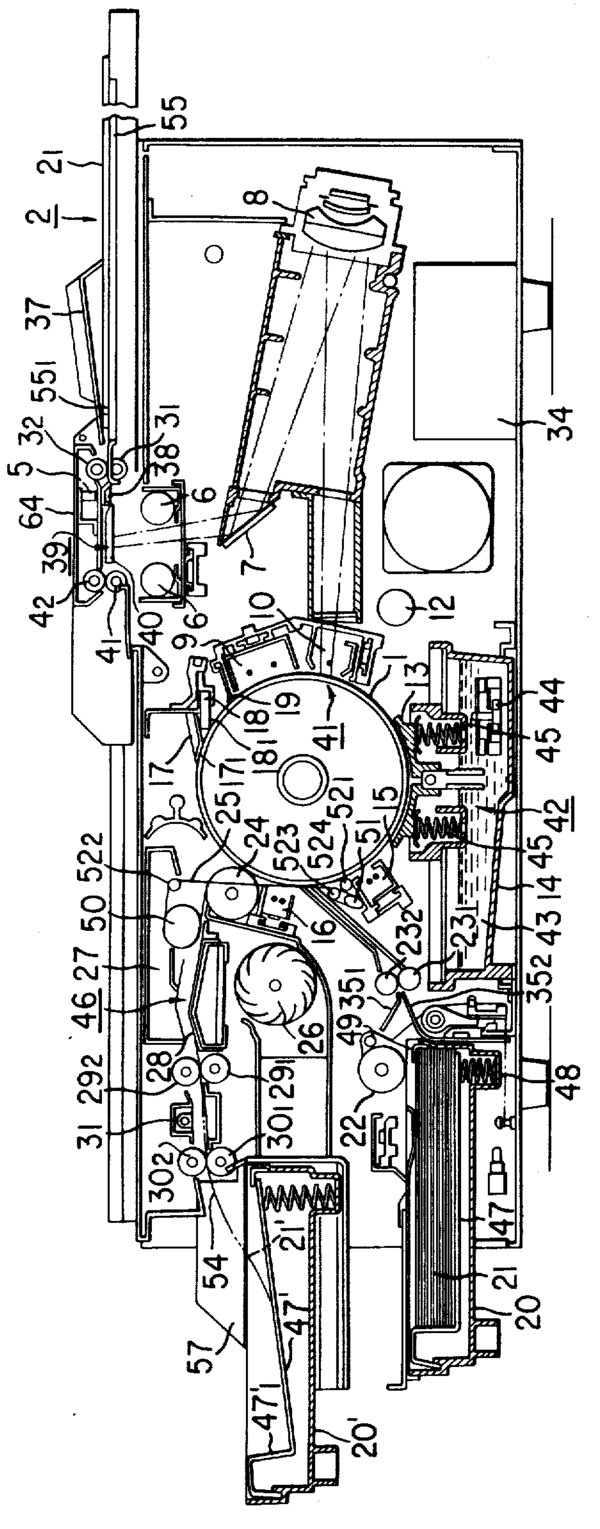
FIG. 1 is a longitudinal front view of an electrophotographic copying machine according to a preferred embodiment of the present invention.

An embodiment of a copying machine to which the present invention is applied will now be described. The copying machine as shown in the drawing is a liquid developing transfer type copying machine, which is designed so as to be able to copy originals such as principally sheet like originals, such as papers, as well as thick originals, such as books, when necessary.

The operation in case of a sheet original will first be described with reference to FIG. 1. When a sheet original is inserted through a guide 37 between sheet original feed first rollers $3_1$ and $3_2$ in a sheet original feed station 64 which rotates in synchronization with a rotary drum 1, said original is moved leftwards. When the extreme end of the original is detected by a sheet original timing lamp 5 and light receiver element 38, the sheet original feed first rollers stop as a result thereof the original also stops. Then, when the drum 1 rotates to a angle required position and an original start signal is received, the sheet original feed first rollers $3_1$ and $3_2$ are again activated, and the original is moved leftwards in synchronization with the drum 1 and is discharged outside the machine by means of sheet original feed second rollers $4_1$ and $4_2$. During that time, the original passes above an original glass 40 in an illumination station 39 and is exposed to light from below by two illuminating lamps 6. An image thereof is formed on the drum at an exposure station 41 by means of a reflecting mirror 7 and an in-mirror lens 8.

The surface of the drum 1 comprises a photosensitive body in which a photosensitive layer is covered with a transparent insulating layer. The photosensitive body is first positively charged by a positive charger 9 which is supplied with a positive high voltage current from a high voltage source 34. When the drum then reaches the exposure station 41, an image from the illumination station 39 is slit exposed and simultaneously and AC charge is supplied thereto by an AC charger 10 which is supplied with an AC high voltage current from the high voltage source 34. As a final step a whole surface exposure through the whole surface exposure lamp 12 an electrostatic latent image is formed on the surface of the drum and advanced into a developing machine 42.

The developing machine 42 comprises a tank 14 for developing solution 43, a pump 44 for stirring and pumping the developing solution, and a developing electrode 13, said electrode 13 being always pressed against the drum 1 by means of a spring 45 maintaining a fine clearance therebetween. The electrostatic latent image formed on the drum 1 is developed and image-formed by toner in the developing solution 43 pumped on the developing electrode 13. Then, a charge made by a negative high current from the high voltage source 34 at a negative charger 15 removes excessive developing solution from the drum 1 without disturbing the image. Then, transfer material 21 transported from the feed station is stuck closely to the drum 1 and the image on the drum 1 is transferred to the transfer material 24 by the charge of a positive high voltage current from the high voltage source 34 at the transfer charger 16. The transfer material 21 having already received on image is separated from the drum 1 by means of a separation belt 25 and is introduced into a drying-and-fixing station 46. The remaining toner and developing solution are wiped away from the drum 1 by the edges $17_1$ and $18_1$ of skirt 17 and blade 18, respectively, and the drum rotates for a successive cycle. The developing solution wiped away by means of cleaners 17 and 18 is introduced into the developing machine 42 through a peripheral groove $1_1$ provided in both ends of the drum 1 and serves for another development. A toner receiver 19 is provided closely to the drum 1 to prevent the toner solidified in the rear surface of the blade 18 from being stuck to the drum and dropped off.

On the other hand, the transfer material 21 is housed in the cassette 20 and is detachably provided in the feed station located at the lower part on the left hand of the machine. Various kinds of cassettes are redy at hand according to sizes of several kinds of transfer materials and may be replaced easily whenever necessary. The transfer materil 21 is put on the intermediary plate 47 within the cassette 20 and the transfer material 21 is always pushed up on the uppermost portion of the cassette 20 by pushing up the intermediary plate 47 by action of a spring 48. In this case, the spring constant of said spring 48 is suitably selected so as to maintain the force by which the uppermost transfer material is pushed up in constant irrespective of the number of transfer materials 21 within the cassette 20.

When the drum 1 reaches a predetermined position, a signal is produced to move down the normally rotating feed roller 22 which in turn is provided in contact with the transfer material at the uppermost portion in the cassette 20, thereby pressing down a given amount of the transfer materials. With this, a separation pawl 49 mounted on both sides of the extreme end of the cassette 20 and rested on the uppermost transfer material moves down with its own weight. A sheet of transfer materil 21 is separated by rotation of the feed roller 22 and by action of the separation pawl 49 and is transported in a right direction of the cassette. However, timing rollers $23_1$ and $23_2$ located nearby will stop immediately after the material feed roller 22 has been moved down so that the transfer material 21 sent out of the cassette 20 slackens between paper guides $35_1$ and $35_2$ in such that the leading end of the material contacts the timing rollers $23_1$ and $23_2$. Immediately after that, the drum 1 transmits a feed start signal and the timing rollers $23_1$ and $23_2$ begin to rotate to feed the transfer material 21 at a speed in line with surface speeds of the drum 1. On the other hand, after the lapse of a given time, the feed roller 22 having previously been moved down moves upwards again separating from the transfer material 21, and thereafter feeding is carried out by feed means provided after the timing rollers $23_1$ and $23_2$.

As previously discussed, the already transferred transfer material 21 adhered closely to the drum 1 is separated from the drum 1 by means of the separation belt 25. The separation belt 25 comprises a narrow endless belt connected to the separation roller 24, turning pulleys 50, 50 and pulleys $52_1$, $52_2$, $52_3$ and $52_4$, arranged in a slight spaced relation with the drum 1. The belt between the pulley $52_1$ and the separation roller 24 is rested on the drum 1 in the position corresponding to the end of a side of the transfer material, and the belt between the pulleys $52_2$ and $52_3$ passes the position displaced from the course where the transfer material passes by action of turning pulleys 50 and 51. The separation belt 25 is driven by the separation roller 24 at the same speed as that of drum 1. At the time when the transfer material 21 is adhered closely to the drum 1 in the transfer process, the end of the one side thereof pinches the separation belt 25 therebetween. As a result, when the separation belt 25 is separated from the drum 1 by means of the separation roller 24, one side of transfer material 21 adhered closely to the drum is forcibly separated from the drum. The transfer material 21 having its one end removed from the drum is completely separated from the drum 1 by its own firmness and as a result of a negative pressure produced by a suction blower 26 the material is sent into the drying and fixing station 46.

In the drying and fixig station 46, the transfer material 21 moves forward having its back surface adhered closely to the hot plate 28 which encases a heater therein so that the material is dried and fixed by conductive heat from the hot plate. The transfer material 21, having dried and fixed its image passes through the first discharging rollers $29_1$ and $29_2$, and after the charge remained on the surface of the material has been removed by a discharger 31, the transfer material is introduced to an outlet 54 by the second discharging rollers $30_1$ and $30_2$ and is discharged outside the machine.

The operation in the case of a book original will now be described. The condition of the sheet original is charged into the condition of the book original by suitably moving the original base 2 leftwards as shown in FIG. 1. In this way, by moving the original base 2 from the sheet original position to the book original position, supply of a driving current to the sheet original feed station 102 is disconnected to that all the circuits may be changed over for use of the book original.

The book original to be copied is put on the original base glass 55 adjusting the extreme end of the original to the extreme end $55_1$ of the glass and held by the holder cover $2_1$, and when a copy button is depressed, the original base 2 is moved leftwards as shown in FIG. 1 by an original start signal in synchronization with the peripheral speed of the drum 1, in a manner similar to that of the sheet original, for slit exposure. In the midst of travel, the original base 2 produces a feed start signal for use in feedig material in synchronization with the exposure. At the termination of exposure, the original base 2 stops its leftward movement, detecting its position, and immediately returns to the reverse direction, that is, rightwards. This return speed is faster than the reciprocating speed so that the efficiency of copying may be promoted. When the original base is returned to its original position for the book original, the original base 2 ceases its movement. The operations other than the above-described are the same as those described with respect to copying a sheet original.

The operation in case of duplex copying will now be described.

Figure 2:
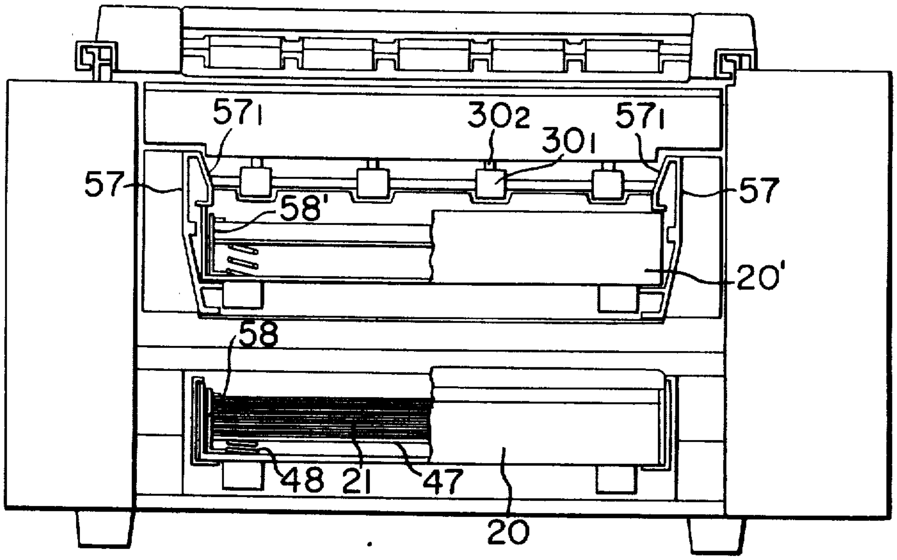
FIG. 2 is a side view partly sectioned of a feeding cassette and an already copied transfer material receiving cassette located to the left in FIG. 1.

A transfer material 21' discharged outside the machine from the outlet 54 after completion of one side copying is put on the intermediary plate 47' in the same cassette 20' as the cassette 20 detachably mounted on the base 57. At this time, the transfer material 21' is introduced into a side plate 58' of the cassette 20' at a guide surface $57_1$ (FIG. 2) of the base 57 and impinges upon a riser portion $47'_1$ of the intermediary plate 47' by the inertia force of the transfer material 21' and put onto the intermediary plate 47' in a properly arranged state.

Figure 3:
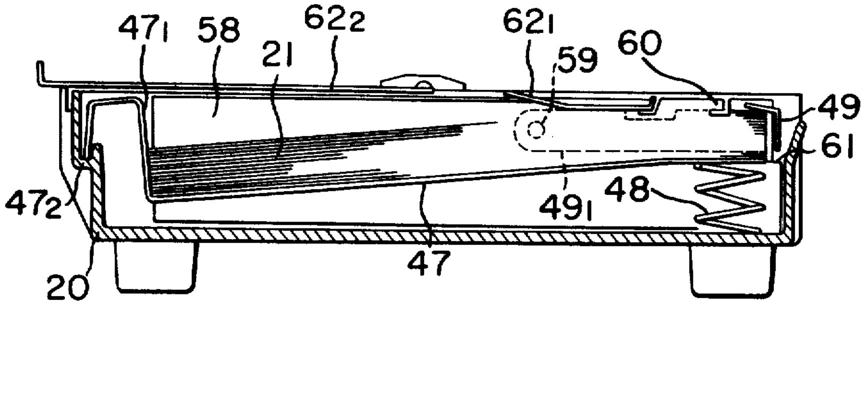
FIG. 3 is a longitudinal front view of the cassette.
Figure 4:
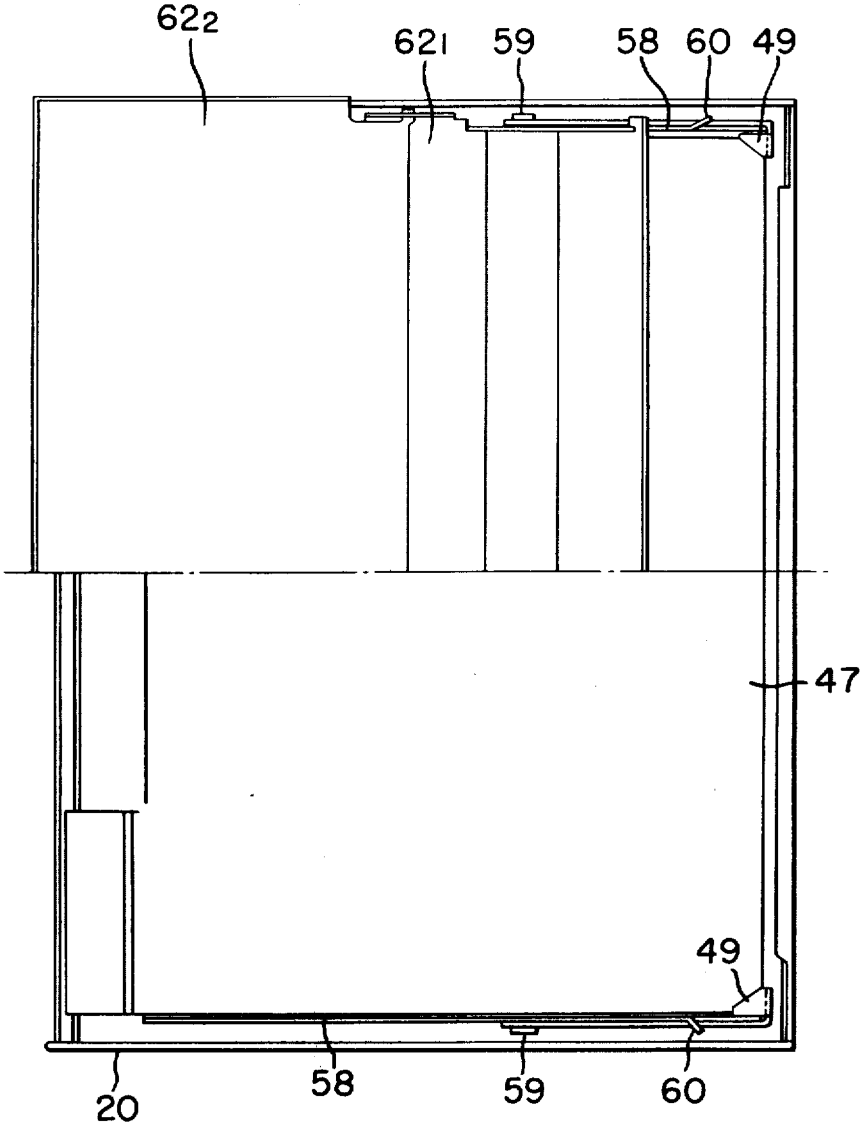
FIG. 4 is a plan view of the same.

The construction of the cassettes 20 and 20' will be described in detail. As shown in FIG. 4, the side plates 58 on both sides are opposedly positioned in spaced relation slightly wider than the width of the transfer material 21 to control the position in a width direction of the transfer material 21. A portion close to the front end of the intermediary plate 47 having the transfer material 21 put thereon is pushed up by a spring 48 with the rear end $47_2$ (FIG. 3) as a supporting point. The raised portion $47_1$ close to the rear end of the intermediary plate 47 controls the position of the rear side of the transfer material 21 put thereon. The separation pawl 49 engaged with a corner portion of the extreme end of the transfer material 21 for separating and transporting the transfer material 21, one by one, put on the cassette is mounted on the end of an arm $49_1$ secured to the side plate 58 by a rotary shaft 59 and is vertically movably supported between upper and lower stoppers 60 and 61 mounted on the side plate 58. The pawl is usually pushed up by means of the spring 48 through the intermediary plate 47 and the transfer material 21, to rest on the stopper 60.

The copying material receiving cassette 20' fixed to the base 57 is an empty cassette having removed covers $62_1$ and $62_2$ (FIG. 3) of the above-described cassette 20'.

Figure 5:
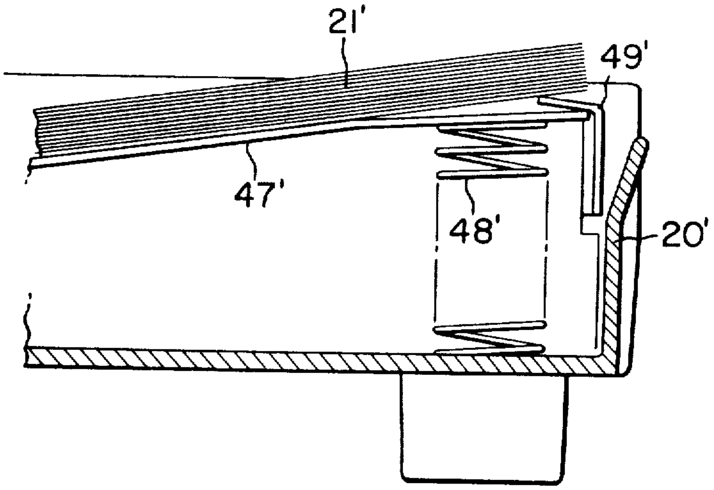
FIGS. 5 and 6 are enlarged longitudinal sections of a part of the cassette showing how the cassette receives already copied transfer materials and how said transfer materials are set below the separating pawl.
Figure 6:
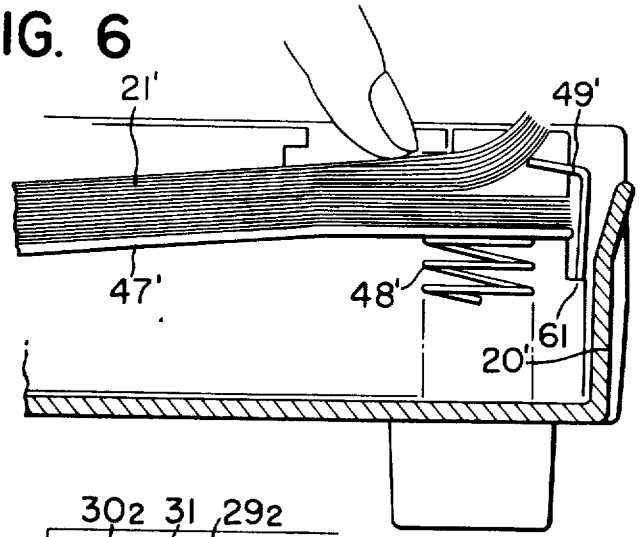

In case of performing duplex copying, the cassette 20', on which a one side copied transfer material 21' is put, is removed from the base 57, and the transfer material 21' (FIG. 5) on the separation pawl 49' is inserted below the separation pawl 49'. This operation may be performed manually by merely pushing a portion near the separation pawl 49' on the transfer material, using a finger (FIG. 6). Namely, when the transfer material 21' is pushed, the spring 48' which pushes up the intermediary plate 47' contracts, and the transfer material 21' and the separation pawl 49' move down. However, the separation pawl 49' impinges upon the stopper 61 located immediately therebelow so that further downward movement thereof is controlled. When the transfer material 21' is pushed down further, the corner portions of the transfer material 21 are bent and finally entered below the separation pawl 49'.

Thus, the transfer material 21' put on the cassette 20' is reversed, as is clear in FIG. 1, as compared with the transfer material put on the cassette 20.

Figure 7:
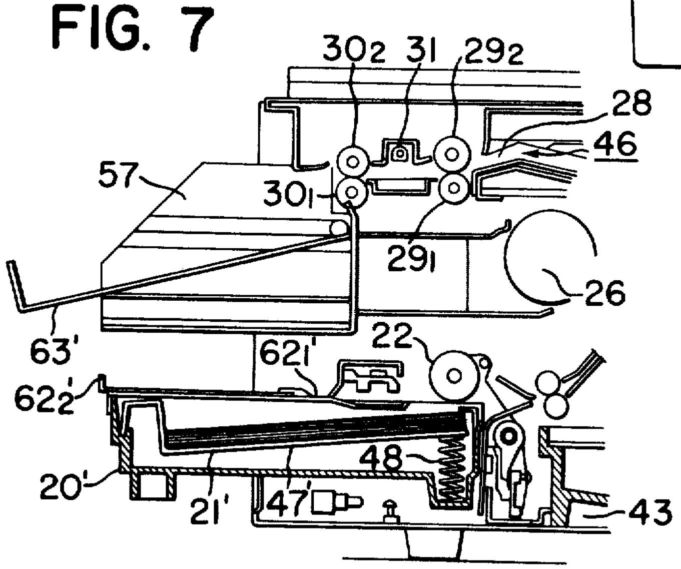
FIG. 7 is a front view of a part of a body provided with a tray for receiving transfer materials which have already been duplex-copied.

Next, covers $62'_1$ and $62'_2$ are attached to the cassette 20', fixed to the feed station instead of the cassette 20, and a tray 63 in place of the cassette 20' is attached to the base 57 as shown in FIG. 7, and then when a copying operation is conducted, a copy, both surfaces of which have been copied, is obtained on the tray 63.

A second embodiment of a copying apparatus to which the present invention is applied will now be described.

Figure 8:
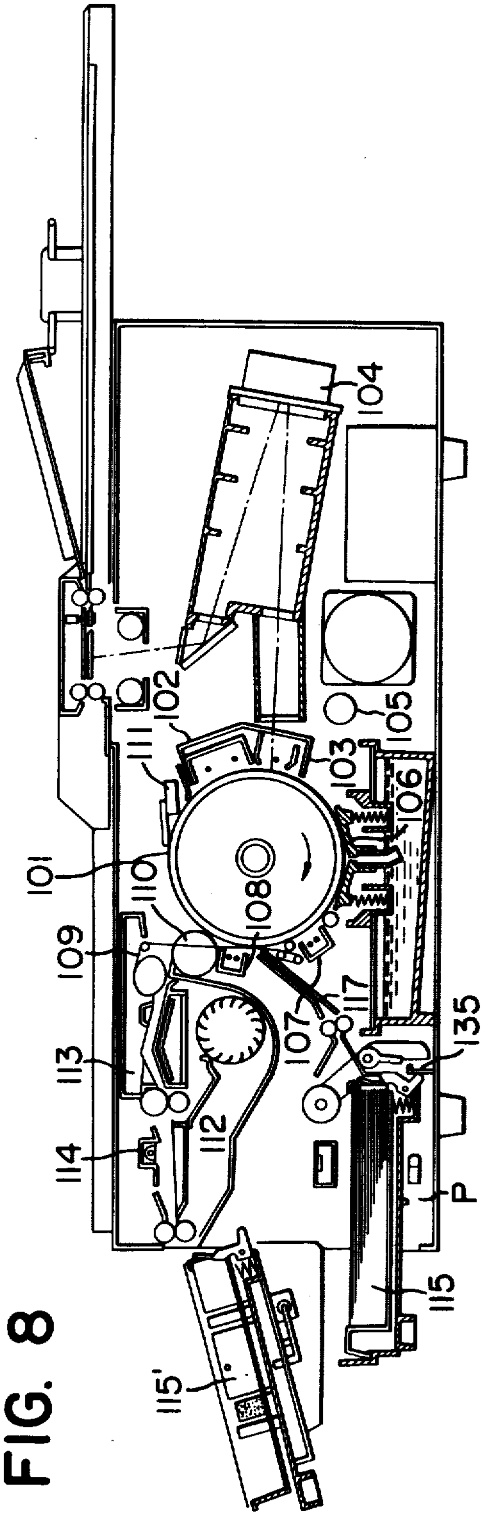
FIG. 8 is a longitudinal front view of an electrophotographic copying machine according to another preferred embodiment of the present invention.

In FIG. 8, the photosensitive drum 101 receives a primary charge by means of a primary charger 102, receives an opposite polarity secondary charge or AC discharge by means of a secondary charger 103 at the same time of an image exposure from a lens 104, and further receives a whole surface exposure by means of a lamp 105 to form a latent image. This latent image is visualized by means of a developing machine 106, developer is removed by a squeezing charger 107 and is transferred to a transfer material P, which is guided through a guide from the feed device, by means of a transfer charger 108. The photosensitive drum 101 further rotates and the remaining image is cleaned by a blade cleaner 111. The image transferred transfer material P is separated by a separation belt 109, a separation roller 110, and a suction blower 112, and is introduced onto a heating and fixing plate 113 for its fixing and further discharged by a discharger 114, and finally fed out onto a material discharging tray T.

Figure 11:
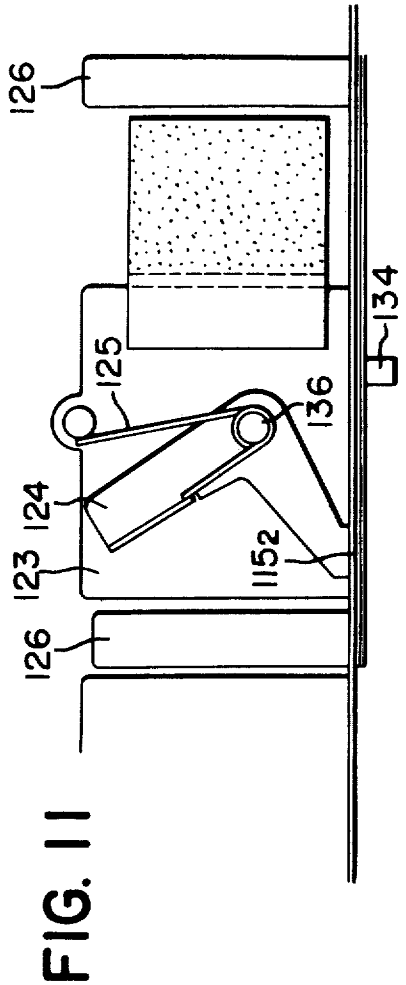
FIG. 11 is a perspective view at A in FIG. 10.
Figure 9:
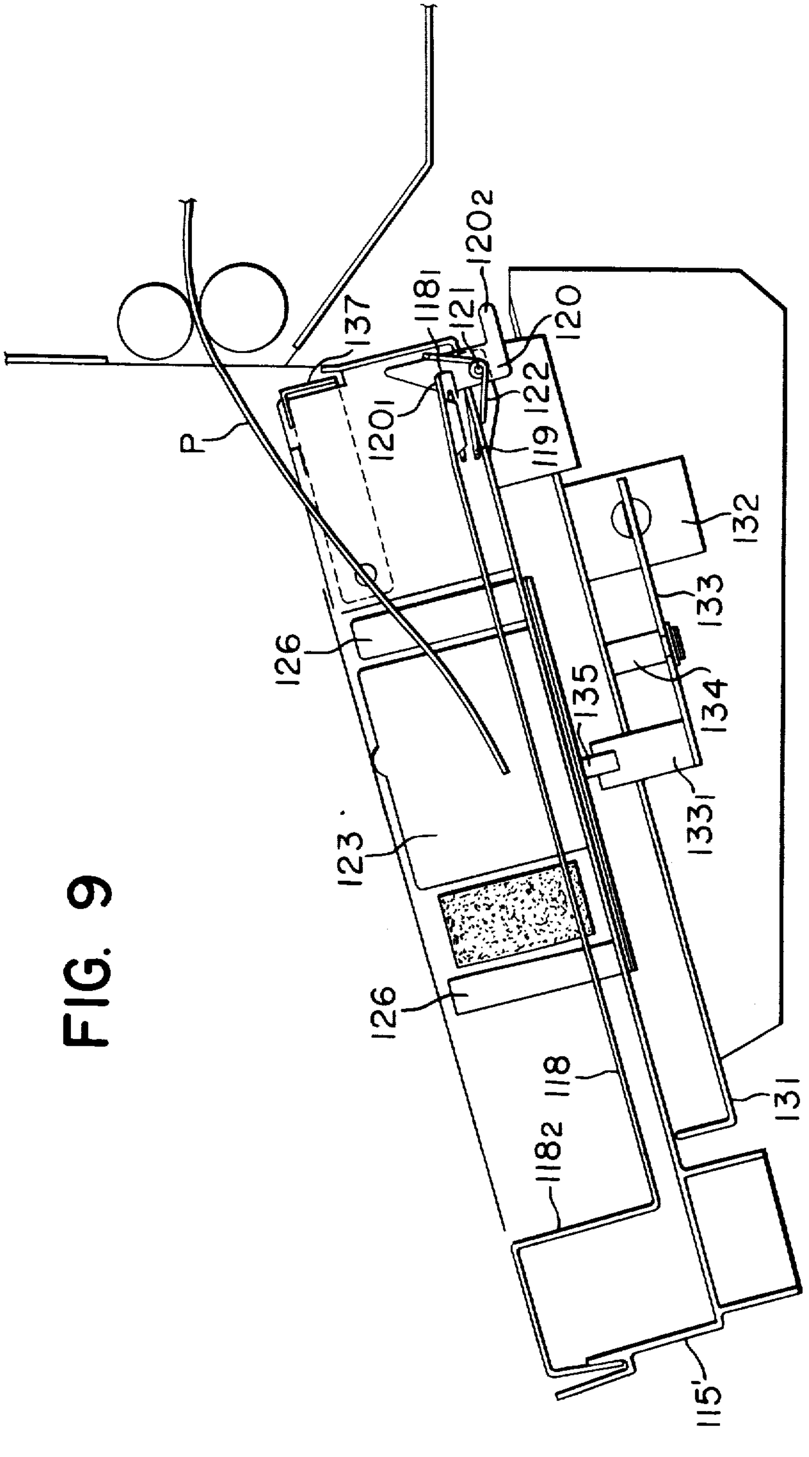
FIG. 9 is a fragmentary section in which the cassette in FIG. 8 is used as a discharging tray.
Figure 10:
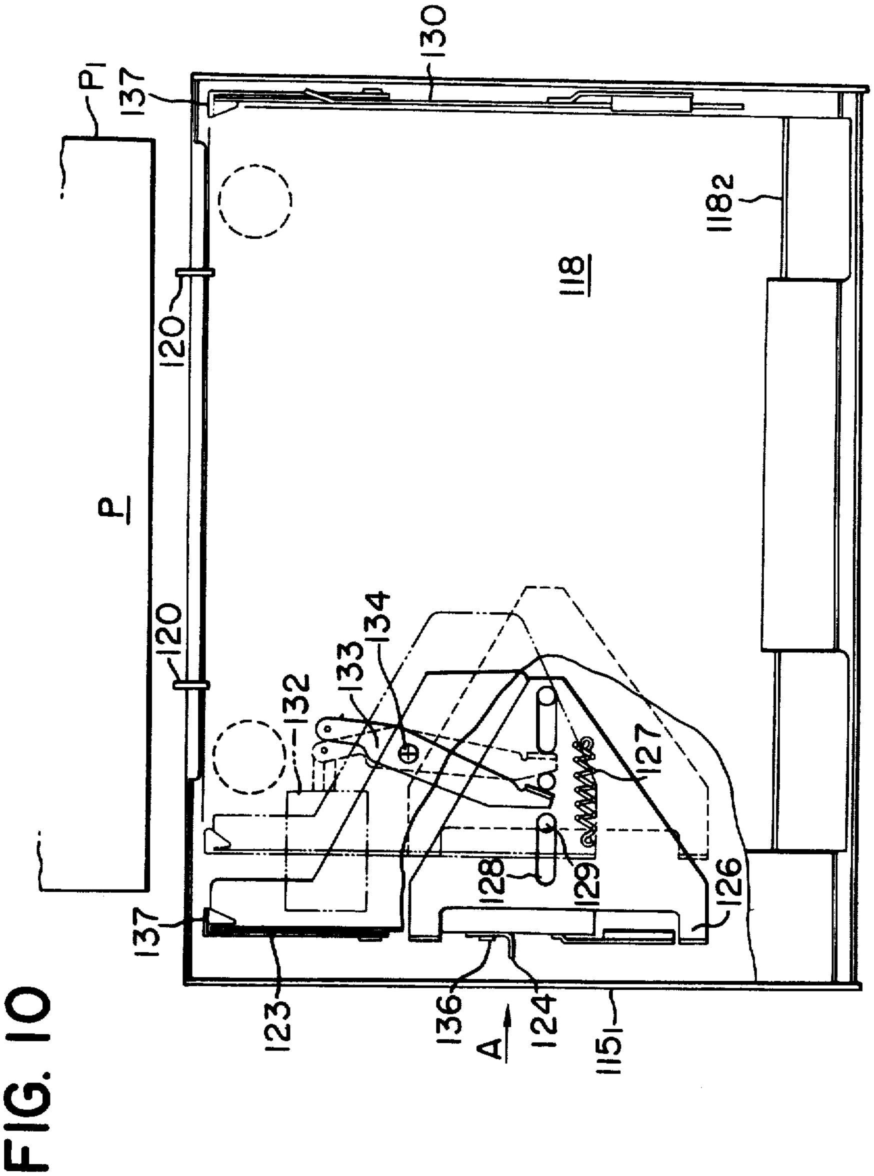
FIG. 10 is a plan view of the cassette in FIG. 9.

Referring to FIGS. 9 to 11, in carrying out duplex copying, when an intermediary plate 118, which is a sheet rest plate, on a cassette 115', is pushed down against a spring 119, an extreme end $118_1$ of the intermediary plate 118 impinges upon a cut portion $120_1$ in a lock plate 120 having the cut portion $120_1$ in the bottom of the cassette and rotatably mounted on the extreme end of the cassette on a shaft 121. When the cut portion $120_1$ as well as the intermediary plate 118 is pushed down on the shaft 121 and loosened, the lock plate 120 is returned together with the intermediary plate 118 to its original position by means of a spring 122, and the intermediary plate 118 is held in position substantially parallel to the cassette bottom to prevent at the upper portion of the cut $120_1$ from being raised upwardly.

Next, a moving side plate 123 shown in FIG. 10 is moved towards the cassette side plate $115_1$. That is, a fixed handle 124 is rotatably mounted on the moving side plate 123 on the shaft 136, the cassette bottom plate $115_2$ is always pressed by means of a spring 125, and the moving side plate 123 is fixed in position. An arranging plate 126 of the cassette 115' is always held in position as indicated by full line in FIG. 10 by means of a return spring 127. The arranging plate 126 being guided by a slot guide 128 and a pin 129 is moved substantially parallel to the side plate to the position as indicated by a broken line in FIG. 10, such that a dowel 135 fixed under the arranging plate is pulled against a spring 127 by a projection $133_1$ at the extreme end of a lever 133 rotatable on a shaft 134. The length from the position as indicated by the broken line to a standard side plate 130 is preset substantially equal to the width of the transfer material P.

With the construction as described above, the intermediary plate 118 in the cassette is first pushed down and locked, and the cassette 115' having the moving side plate 123 expanded is placed in position on a cassette support plate 131 mounted on the material discharging tray station in the copying machine, so that the standard side plate 130 is to be disposed outside the standard side $P_1$ of the transfer discharged material, as shown in FIG. 10. It is further noted that when the moving side plate 123 opposite to the standard side plate 130 is expanded, said plate is positioned outside opposite to the standard side $P_1$ of the transfer material.

Then, the transfer material P discharged from the copying machine falls on the intermediary plate 118 pushed down and locked by its own weight and stops at a rear end standard member $118_2$ along the intermediary plate 118. A magnetic plunger 132 is energized by a timer, etc., substantially in line with the stoppage of the transfer material, and the lever 133 is turned on the shaft 134 and the projection $133_1$ at the extreme end of the lever 133 is in engagement with the dowel 135 integral with the arranging plate 126, and upon rotation of the lever 133, the arranging plate 126 is moved from the full line to the broken line in FIG. 10 by the slot 128 and the pin 129 to push the transfer material P towards the standard side plate 130.

To perform duplex copying after the required number of sheets have been copied, the fixed handle 124 is unlocked and the moving side plate 123 is moved to the feed position as required, that is to the position where said plate impinges upon the side end of the transfer material, and is relocked by the fixed handle 124. Upon completion of the above described operation, the discharging cassette 115' is attached to the feed position as required after the previous feed cassette 115 has been removed. An extreme end $120_2$ of a lock plate 120 shown in FIG. 9 impinges upon a front plate 135 secured to the copying machine, the lock plate 120 rotates on the shaft 121 in a clockwise direction as shown, the intermediary plate 118 is unlocked by the cut portion $120_1$ in the lock plate 120, the intermediary plate 118 is pushed up by the spring 119, and the transfer material P is pressed by the separation pawl 137 and placed in feed condition. With this, duplex copying may be carried out through a normal copying operation.

We claim:

1. A duplex copying machine adapted to produce images of an original on both sides of a copy paper comprising a housing, an original holder, an exposure slit, optical means for exposing a photosensitive member to an original image through said slit, copying processing means for forming said original image on one side of said copy paper, driving means for driving said copying processing means, means providing a copy paper feeding station and a discharging station, a first copy paper cassette detachably mounted at said copy paper feeding station for holding copy papers, means for feeding copy paper to said copying processing means from said first copy paper cassette when mounted at said feeding station, and a second copy paper cassette detachably mounted at said copy paper discharging station for receiving copy paper upside down, relative to the copy paper in said first copy paper cassette, after completion of a first copying process on one side thereof, said second copy paper cassette being also detachably mountable at said copy paper feeding station and said feeding means being operable to feed said copy paper to said processing means from said second cassette when mounted at said feeding station, whereby after said copy paper is received in said second cassette the positions of said first and second copy paper cassettes are reversed and another copying process is conducted to thereby obtain a copy paper having original images on both sides.

2. The duplex copying machine of claim 1, wherein each of said first and second copy paper cassettes comprises an intermediate plate normally biased upwardly by spring means for imparting a predetermined upwardly pressing force on the copy papers contained therein and vertically movable separating pawl means resting on the topmost copy paper in said cassette for separating the copy papers one by one.

3. The duplex copying machine of claim 2, wherein each of said first and second copy paper cassettes includes intermediate plate lock means for locking said intermediate plate in the vicinity of the bottom portion of the cassette.

4. The duplex copying machine of claim 3, wherein said machine further comprises intermediate plate lock releasing means for automatically releasing said intermediate plate lock means when either of said cassettes is mounted at said copy paper feeding station.

5. The duplex copying machine of claim 1, wherein said machine further comprises guide means disposed in the vicinity of said copy paper discharging station for guiding a copy paper discharged upside down from the machine after completion of said first copying process to a predetermined position in said second copy paper cassette mounted at said copy paper discharging station by restricting the widthwise direction of said copy paper.

6. The duplex copying machine of claim 1, wherein each of said first and second copy paper cassettes includes a movable side plate member which is movable to widen the inlet for receiving copy papers when mounted at said copy paper discharging station and which is movable to press the copy papers at a predetermined position when mounted at said copy paper feeding station.

7. The duplex copying machine according to claim 6, wherein said machine further comprises a fixed side member and an arranging means movable toward said fixed side member to position the copy papers at a predetermined position before the copy papers are pressed by said plate member.

8. In a copying apparatus which includes a housing, an original holder, a single photosensitive member, means to produce and develop a latent image of said original on said photosensitive member including optical means to expose said photosensitive member to said original, and means for transferring and fixing the developed image onto a copy paper, the improvement comprising additional means enabling said copying apparatus to produce images of an original on both sides of said copy paper which includes first and second copy paper cassettes disposed at a copy paper feeding station and a copy paper discharging station, respectively, said first copy paper cassette being detachably mounted at said copy paper feeding station and accommodating copy papers to be fed to said transferring and fixing means, said first copy paper cassette also being detachably mountable at said copy paper discharging station, said second copy paper cassette being detachably mounted at said copy paper discharging station for receiving copy paper upside down, relative to the copy paper in said first copy paper cassette, after completion of a copying process on one side thereof, said second copy paper cassette also being detachably mountable at said copy paper feeding station, whereby the positions of said first and second copy paper cassettes is reversed and another copying process is conducted to thereby obtain a copy paper having original images on both sides thereof.

9. A duplex copying machine adapted to produce images of an original on both sides of a copy paper comprising a housing, an original holder, an exposure slit, optical means for exposing a photosensitive member to an original image through said slit, copying processing means for forming said original image on one side on said copy paper, driving means for driving said copying processing means, a first copy paper cassette for accommodating copy papers to be fed to said copying processing means, and a second copy paper cassette for receiving copy paper upside down, relative to the copy paper in said first cassette, after completion of a copying process on one side thereof; said housing including a first holder means positioned at a copy paper feeding station and a second holder means positioned at a copy paper discharging station, said holder means interchangeably and detachably mounting said first and second cassettes, and at least said second cassette including arranging means for properly stacking copy paper in said second cassette as said paper exits said discharging station, whereby after said copy paper has been fed through the machine from said first cassette to impose an image on one side of the copy paper, and has been arranged in said second cassette, the positions of said first and second cassettes ae reversed and another copying process is conducted on the other side of the copy paper to thereby obtain a copy paper having original images on both sides.

* * * * *